(12) United States Patent
Zachäus

(10) Patent No.: US 12,342,107 B2
(45) Date of Patent: Jun. 24, 2025

(54) DYNAMICALLY ADJUSTABLE SURVEILLANCE SYSTEM AND METHOD OF DYNAMICALLY ADJUSTING OPERATION MODES OF A SURVEILLANCE SYSTEM

(71) Applicant: KID-Systeme GmbH, Buxtehude (DE)

(72) Inventor: Matthias Zachäus, Buxtehude (DE)

(73) Assignee: KID-SYSTEME GMBH, Buxtehude (DE)

( * ) Notice: Subject to any disclaimer, the term of this patent is extended or adjusted under 35 U.S.C. 154(b) by 116 days.

(21) Appl. No.: 18/317,863

(22) Filed: May 15, 2023

(65) Prior Publication Data

US 2023/0370571 A1 Nov. 16, 2023

(30) Foreign Application Priority Data

May 16, 2022 (EP) ..................................... 22173616

(51) Int. Cl.
*H04N 7/18* (2006.01)
*G06V 20/17* (2022.01)
*G06V 20/52* (2022.01)
*H04N 23/66* (2023.01)
(Continued)

(52) U.S. Cl.
CPC ............. *H04N 7/185* (2013.01); *G06V 20/17* (2022.01); *G06V 20/52* (2022.01); *H04N 23/66* (2023.01); *H04N 23/667* (2023.01); *H04N 23/69* (2023.01)

(58) Field of Classification Search
None
See application file for complete search history.

(56) References Cited

U.S. PATENT DOCUMENTS

| | | |
|---|---|---|
| 4,063,251 A | 12/1977 | Harsnett |
| 11,208,134 B2 | 12/2021 | Carter et al. |
| 2010/0283857 A1 | 11/2010 | Gopinath |

(Continued)

FOREIGN PATENT DOCUMENTS

| | | |
|---|---|---|
| DE | 102007051196 | 4/2009 |
| DE | 102020213560 | 4/2022 |

(Continued)

OTHER PUBLICATIONS

Extended Search Report for EP22173616.8, dated Oct. 14, 2022, 6 pages.

*Primary Examiner* — Eileen M Adams
(74) *Attorney, Agent, or Firm* — Nixon & Vanderhye P.C.

(57) ABSTRACT

A dynamically adjustable surveillance system including: a surveillance camera having a field of vision encompassing an object to be monitored and generating an image stream of the field of vision, a surveillance camera controller configured to control operation parameters of the surveillance camera, the operation parameters indicating operation conditions of the camera, a surveillance controller coupled to the surveillance camera controller, and a sensing device coupled to the surveillance controller and configured to output an object state signal to the surveillance controller indicating a sensed state of the object to be monitored. The surveillance controller is configured to output a control signal to the surveillance camera controller to change some of the operation parameters of the surveillance camera if the object state signal received from the sensing device indicates a sensed state of the object to have changed.

15 Claims, 1 Drawing Sheet

(51) Int. Cl.
  *H04N 23/667* (2023.01)
  *H04N 23/69* (2023.01)

(56) References Cited

U.S. PATENT DOCUMENTS

| | | | |
|---|---|---|---|
| 2015/0070492 A1* | 3/2015 | Hozumi | B64D 11/00 348/143 |
| 2016/0270527 A1 | 9/2016 | Winter | |
| 2016/0344918 A1* | 11/2016 | Tao | H04N 23/63 |
| 2021/0027590 A1* | 1/2021 | Lin | G06T 7/11 |
| 2022/0005332 A1* | 1/2022 | Metzler | G06F 18/2431 |

FOREIGN PATENT DOCUMENTS

| | | |
|---|---|---|
| EP | 1440883 | 7/2004 |
| EP | 2845801 | 3/2015 |
| WO | 2017155448 | 9/2017 |

* cited by examiner

DYNAMICALLY ADJUSTABLE SURVEILLANCE SYSTEM AND METHOD OF DYNAMICALLY ADJUSTING OPERATION MODES OF A SURVEILLANCE SYSTEM

RELATED APPLICATION

This application incorporates by reference and claims priority to European patent application EP 22173616.8, filed May 16, 2022.

TECHNICAL FIELD OF THE INVENTION

The invention relates to a surveillance system the operation modes of which are dynamically adjustable in real-time, particularly for monitoring predetermined objects and/or spaces on board of a passenger aircraft. Moreover, the invention relates to a method of dynamically adjusting operation modes of a surveillance system, particularly for monitoring predetermined objects and/or spaces on board of a passenger aircraft.

TECHNICAL BACKGROUND

In-flight sales services are increasingly gaining economic importance for airlines, such as the offering, sale and dispensation of high-value goods during flight to passengers of a passenger aircraft. Typically, these goods are stored in a specifically designed and configured mobile transport container or trolley. Cabin crew members may move the trolley within the cabin for the purpose of offering the merchandise and, if purchased, handing it out to passengers.

During phases of flight when no sales are taking place, mobile transport containers containing the merchandise or other goods are typically stowed in a storage location during flight phases in which in-flight sales services are not allowed or not desirable. The storage location may for example be a designated storage compartment of a shelving arrangement in or near the galley. When stowed away, the trolley is usually unattended and therefore prone to unauthorized access by passengers as well as by cabin crew members or flight attendants. Other movable objects such as pieces of luggage or stationary transport containers such as overhead bins above passenger seats may also be temporarily unattended, increasing the risk of unauthorized access.

Modern aircraft are typically equipped with a video surveillance system used to monitor and oversee any events in the passenger cabin, with cameras distributed throughout the cabin to capture video image data. The captured video image data is usually displayed on a display arranged, for example, in the cockpit, in the galley or in a lounge area of the flight attendants. Such video surveillance systems are disclosed, for example, in EP 1 440 883 A1 or DE 10 2007 051 196 A1. For reasons of privacy, data protection regulations and/or efficient utilization of data processing resources, the captured video image data is often not or only temporarily stored.

Document WO 2017/155448 A1 discloses a method for burglary detection in a vehicle, the method including the steps of activating at least one sensor of the vehicle, triggered by a vehicle alarm alert, capturing an image with the sensor of the vehicle, detecting a predefined object in the captured image, and storing the captured image when the predefined object is detected in the image.

Document U.S. Pat. No. 11,208,134 B2 discloses a system for monitoring shopping baskets that includes a computer vision unit configured to image a surveillance region, determine whether a basket is empty or loaded with merchandise, and assess a potential for theft of the merchandise.

Document US 2016/0270527 A1 discloses lockable mobile or portable container systems used in transportation vehicles for transporting and delivery of materials such as food and drink trolleys, containers for merchandise and other goods.

SUMMARY OF THE INVENTION

The invention may be employed as an improved solution for efficient use of data processing resources for video image data captured on board of an aircraft.

According to a first aspect of an embodiment of the invention, a dynamically adjustable surveillance system, in particular for use on board of an aircraft, comprises at least one surveillance camera having a field of vision encompassing an object to be monitored and generating an image stream of the field of vision, a surveillance camera controller configured to control operation parameters of the at least one surveillance camera, the operation parameters indicating operation conditions of the at least one surveillance camera, a surveillance controller coupled to the surveillance camera controller, and at least one sensing device coupled to the surveillance controller and configured to output an object state signal to the surveillance controller indicating a sensed state of the object to be monitored. The surveillance controller is configured to output a control signal to the surveillance camera controller to change some of the operation parameters of the at least one surveillance camera if the object state signal received from the at least one sensing device indicates a sensed state of the object to have changed.

According to a second aspect of an embodiment of the invention, a method of dynamically adjusting operation modes of a surveillance system on board of an aircraft includes the steps of generating an image stream in the field of vision of at least one surveillance camera monitoring an object; sensing, by at least one sensing device, a state of the object to be monitored; outputting, by at least one sensing device, an object state signal to a surveillance controller of the surveillance system indicating a sensed state of the object to be monitored; outputting, responsive to the object state signal received from the at least one sensing device indicating a sensed state of the object to have changed, a control signal from the surveillance controller to a surveillance camera controller; and changing, by the surveillance camera controller in response to the reception of the control signal from the surveillance controller, operation parameters of the at least one surveillance camera, the operation parameters indicating operation conditions of the at least one surveillance camera.

According to a third aspect of an embodiment of the invention, an aircraft, in particular a passenger aircraft, comprises a dynamically adjustable surveillance system according to the first aspect of the invention. The surveillance system may in some embodiments be configured to monitor or keep under surveillance one or more mobile transport containers stowed in a galley of the aircraft according to the third aspect of the invention.

With the solutions according to the invention, the modes of operation of a surveillance system on board of an aircraft may be flexibly controlled, depending on external triggers by one or more sensor devices which are connected to the surveillance system for triggering the change of the mode of operation of the surveillance system.

A particular advantage of the solutions according to an embodiment(s) of the invention is that the external triggers are communicated to the surveillance system via a separate communication channel. In other words, the flexible control of the modes of operation of the surveillance system is not dependent on triggers within the captured video image stream itself. This provides for a more reliable and resource efficient configuration in which the surveillance cameras and/or the processing systems controlling the surveillance cameras are not burdened with monitoring the emergence of triggering events. Moreover, the triggering events may be more reliably detected as the respective communication channel(s) may be hard-wired and/or not as easily compromised as a vision-based communication channel.

Advantageous configurations and refinements will become understood from the further dependent claims and from the description with reference to the figures.

According to some embodiments of the dynamically adjustable surveillance system, the operation parameters may include one or more of image stream resolution, image stream frame rate, temporal storage length of the image stream and image stream permanent storage of the at least one surveillance camera. In particular, the operation parameters may affect the operational efficiency of the surveillance camera(s) in terms of data bandwidth, image stream quality, image stream file size, speed of image processing and the like. This advantageously allows the resources of the surveillance system to be used more efficiently, due to the flexible change of operation parameters depending on whether or not external triggers such as the sensing of specific states of objects of interest under surveillance are detected.

According to some further embodiments of the dynamically adjustable surveillance system, the surveillance system may further include a permanent data storage. In some embodiments, the surveillance camera controller may be configured to control the at least one surveillance camera to store the generated image stream in the permanent data storage on the basis of the control signal received from the surveillance controller. Data storage space may be limited in surveillance systems so that constantly recording and storing any image stream of objects of interest under surveillance may be impractical. The reliance of the surveillance system on external triggers may advantageously increase stability and reliability of the system, while increasing efficiency in only storing those video image data sets that are actually deemed to be relevant for purposes of surveillance.

According to some further embodiments of the dynamically adjustable surveillance system, the surveillance camera controller may be configured to change some of the operation parameters of the at least one surveillance camera for a predetermined period of time after having received a control signal from the surveillance controller. In this manner, the sensing of specific states of objects of interest under surveillance will trigger a phase of heightened awareness of the surveillance system.

According to some further embodiments of the dynamically adjustable surveillance system, the surveillance camera controller may be configured to analyse the image stream generated by the at least one surveillance camera for deviations from a reference rule set based on self-learning algorithms, to annotate the analysed image stream and to store the annotated image stream in the permanent data storage.

According to some further embodiments of the dynamically adjustable surveillance system, the object to be monitored may be a mobile transport container. According to some further embodiments of the dynamically adjustable surveillance system, the at least one sensing device may include a latch sensor coupled to a latch of the mobile transport container, the latch sensor being configured to sense a locking state of the latch of the mobile transport container. The surveillance system may be particularly suited to monitor mobile transport containers in order to detect theft or unauthorized access to the container. In that regard, an already implemented cabin video monitoring system having surveillance cameras may be used to implement the additional functionality of monitoring mobile transport containers, for example when stowed away in a galley area of an aircraft. Due to the external triggering by the latch sensors, there is no particular need for the existing cabin video monitoring system to be modified to a greater extent.

According to some embodiments of the method of dynamically adjusting operation modes of a surveillance system, the operation parameters may include one or more of image stream resolution, image stream frame rate, temporal storage length of the image stream and image stream permanent storage of the at least one surveillance camera.

According to some further embodiments of the method of dynamically adjusting operation modes of a surveillance system, changing the operation parameters of the at least one surveillance camera may include controlling the at least one surveillance camera to store the generated image stream in a permanent data storage on the basis of the control signal received from the surveillance controller.

According to some further embodiments of the method of dynamically adjusting operation modes of a surveillance system, the object to be monitored may be a mobile transport container. In some embodiments thereof, the at least one sensing device may include a latch sensor coupled to a latch of the mobile transport container, the latch sensor being configured to sense a locking state of the latch of the mobile transport container.

According to some further embodiments of the method of dynamically adjusting operation modes of a surveillance system, the at least one surveillance camera is monitoring an object in the galley of an aircraft, such as for example mobile transport containers or trolleys.

The above configurations and refinements may be combined with one another as desired where expedient. Further possible embodiments, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

BRIEF SUMMARY OF THE DRAWINGS

The present invention will be discussed in more detail below on the basis of the exemplary embodiments shown in the schematic figures. In the figures.

Figure 1:
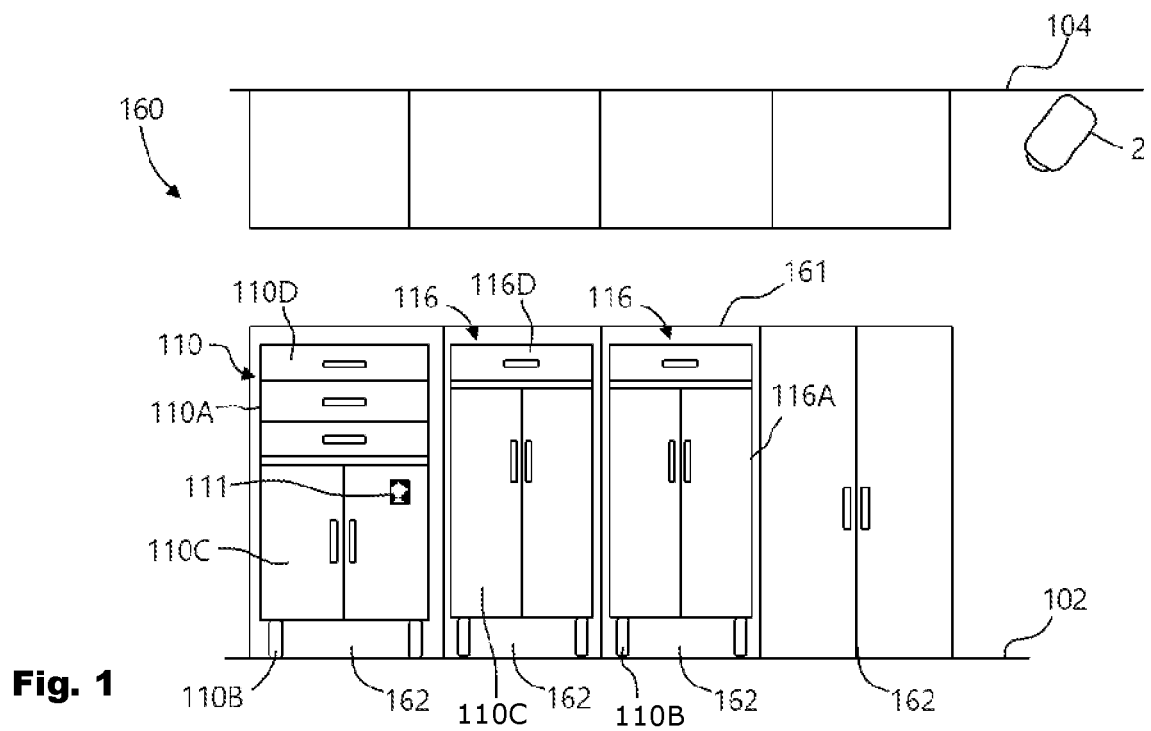
FIG. 1 shows a schematic diagram of a galley environment under video surveillance on board of an aircraft according to one embodiment of the invention.

The appended figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, elements, features and components which are identical, functionally identical and of identical action are denoted in each case by the same reference designations unless stated otherwise.

DESCRIPTION OF EXEMPLARY EMBODIMENTS

Trolleys within the meaning of the present disclosure, sometimes also referred to as trolley cart, are mobile transport containers supplied by an air carrier for use by flight attendants or other cabin crew members inside the aircraft for transport of various items dispensed or offered to passengers, such as beverages, airline meals, merchandise and other in-flight sales service items. Trolleys may be implemented as a rigid or semi-rigid, generally rectangular cuboid box with rigid or swivel casters at each bottom corner to roll the trolley along aisles of an aircraft. Trolleys may be full-size or half-size, depending on the type, size and use of the aircraft they are deployed in. Trolleys may have lockable doors at the top, the back and/or the front and may or may not have handles are provided at the top.

In the following description, reference is made to self-learning algorithms, which are used in an artificial intelligence (AI) system. Generally speaking, a self-learning algorithm emulates cognitive functions that are assigned to a human thinking performance according to human judgment. In doing so, by adding new training information, the self-learning algorithm can dynamically adapt the knowledge previously gained from old training information to the changed circumstances in order to recognize and extrapolate patterns and regularities in the totality of the training information.

In self-learning algorithms within the meaning of the present disclosure, all types of training forming human cognition can be used, such as supervised learning, semi-supervised learning, autonomous learning based on generative, non-generative or deep adversarial networks ("AN"), reinforcement learning or active learning. Feature-based learning ("representation learning") can be used in each instance. In particular, the self-learning algorithms within the meaning of the present disclosure may perform iterative adaptation of parameters and features to be learned via feedback analysis.

A self-learning algorithm within the meaning of the present disclosure may be based on a support vector classifier (SVC), a neural network such as a convolutional neural network (CNN), a Kohonen network, a recurrent neural network, a time-delayed neural network (TDNN), or an oscillatory neural network (ONN), a random forest classifier, a decision tree classifier, a Monte Carlo network, or a Bayesian classifier. In this regard, a self-learning algorithm in the sense of the present invention may employ feature-hereditary algorithms, k-means algorithms such as Lloyd's or MacQueen's algorithms, or TD learning algorithms such as SARSA or Q-learning.

Figure 3:
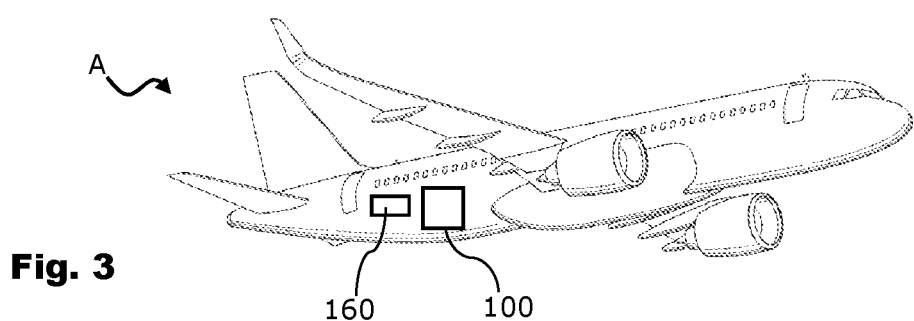
FIG. 3 shows an aircraft having a surveillance system according to a further embodiment of the invention.

FIG. 3 shows, by way of example only, an aircraft A. As shown by way of example in FIG. 3, the aircraft A includes a surveillance system 100 used for monitoring the surrounding of a mobile transport container for goods, such as an aircraft trolley.

For example, the aircraft A of FIG. 3 may be a passenger aircraft that includes a passenger cabin. A plurality of seats (not shown) may be disposed in the passenger cabin. The passenger cabin may further include an aircraft kitchen 160, hereinafter also referred to as a galley 160, in which various mobile transport containers are placed for transporting goods within the passenger cabin.

A galley 160 is shown in FIG. 1 purely by way of example and only schematically. The galley 160 of FIG. 1 may for example be implemented in an aircraft, such as the aircraft A as depicted in FIG. 3. For example, the galley 160 may include a shelf arrangement 161 disposed on the floor 102 of the passenger cabin defining one or more adjacent shelves 162. As exemplified in FIG. 1, the shelving compartments 162 may be used to temporarily store wheeled transport containers 110, 116 or trolleys. The transport containers 110, 116 may include a body 110A, 116A defining an interior space and wheels 110B connected to the body 110A, 116A such that the transport container 110, 116 is movable on the floor 102. The interior space defined by the body 110A, 116A may house merchandise, such as food and beverages or high-end retail merchandise such as watches, tobacco products, cosmetic products, or the like. The goods can be removed from the respective transport container 110, 116 through an access opening which can be closed, for example, by a door 110C or from which a drawer 110D can be pulled out, as this is shown schematically in FIG. 1.

During a flight, the transport containers 110, 116 can be removed from the shelf arrangement 161 by cabin crew members or flight attendants and moved along the aisles of an aircraft to the passenger seats, for example to offer goods for sale to the passengers or to offer drinks and food. When not in use, the transport containers 110, 116 are generally stowed away in the shelf arrangement 161 or in another storage area provided for this purpose in the cabin.

Some or all of the mobile transport containers-here exemplarily shown for the transport container 110 may be equipped with an optical marker 111 which may be visibly attached to the transport container 110, as shown by way of example in FIG. 1. The optical marker 111 may be, for example, a barcode, a QR code, a colour marking, or the like. The optical marker 111 may be used to identify and distinguish between different the transport containers on a captured video image stream taken by a surveillance camera module 2 monitoring the galley 160 entirely or partially. For reasons of clarity, only a single surveillance camera module 2 is depicted in FIG. 1, however, multiple surveillance cameras may be placed at different positions in or near the galley area.

For example, one or more surveillance cameras of the surveillance camera module 2 may be configured keep space in front of or generally near the transport containers 110, 116 under surveillance. This space may also be referred to as a detection zone, and may be, for example, a portion of space defined by the projection of a perimeter of the transport container, such as a cuboidal space located in front of a boundary of the transport containers 110, 116 through which goods may be removed from the transport containers 110, 116. The detection zone may in particular include spaces in front of or near compartments of the transport containers 110, 116 which can be closed by doors and/or drawers which can be pulled out.

Figure 2:
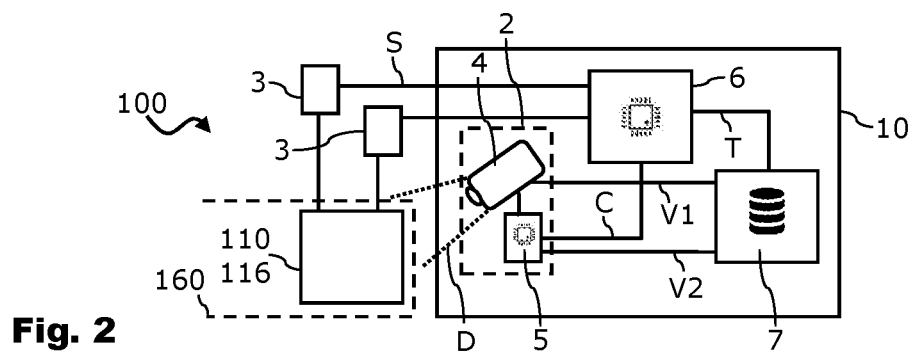
FIG. 2 shows a schematic block diagram of a surveillance system used for video surveillance on board of an aircraft according to one embodiment of the invention.

FIG. 2 illustrates a block diagram of a surveillance system 100 that employs one of more surveillance camera module 2 for monitoring certain areas on board of an aircraft, such as for example the aircraft A exemplarily depicted in FIG. 3. For reasons of clarity, only a single surveillance camera module 2 is depicted in FIG. 1, however, multiple surveillance camera modules 2 may be placed at different positions on board of the aircraft. Moreover, the surveillance system 100 of FIG. 1 is illustrated to be used for monitoring or keeping under surveillance a galley 160, however, it should be understood that the surveillance system 100 may alternatively or additionally also be used to monitor or keep under surveillance other areas or parts on board of an aircraft, such as parts of the passenger cabin, sanitary equipment, cargo areas or cockpit areas.

The surveillance camera modules 2 include a surveillance camera 4 having a field of vision D that generally encompasses one or more objects to be monitored, such as for example the mobile transport containers 110, 116 as depicted in FIG. 1. The surveillance camera 4 generates an image stream of a scene within the field of vision D, including the one or more objects 110, 116 to be monitored and its/their surroundings. The surveillance cameras 4 may include an optical sensor, such as a CMOS sensor, and an optical arrangement that focuses light reflected from objects in the field of vision D onto the sensor, the sensor being arranged to output corresponding video image data. The surveillance cameras 4 may thus be implemented in a conventional manner.

The surveillance camera modules 2 further include a surveillance camera controller 5 that is configured to control operation parameters of the surveillance camera 4. Those operation parameters indicate operation conditions of the surveillance camera 4, such as for example an image resolution of the captured image stream, a frame rate of the captured image stream, the temporal storage length of the image stream (i.e. the duration for how long captured image streams are temporarily stored in an internal storage of the surveillance camera module 2) or the capability of the image streams to be permanent stored by the surveillance camera 4. In some implementations, the system 100 includes a permanent data storage 7 for storing captured image streams V1 by the surveillance camera 4. In particular, the permanent data storage 7 may comprise a non-volatile storage medium, such as HDD storage or SSD storage. The surveillance camera controller 5 may control the operation of the surveillance camera 4, particularly with regard to whether or not to store the generated image stream V1 in the permanent data storage 7.

In some implementations, the surveillance camera controller 5 may analyse the image stream generated by the at least one surveillance camera 4 for deviations from a reference rule set based on self-learning algorithms. For example, the captured video data may be received at the surveillance camera controller 5. The captured video data may include temporally and spatially resolved observation data about situations and processes of or around the objects 110, 116 to be monitored. The surveillance camera controller 5 may in this regard comprise an AI system. The AI system includes an AI processor, a rule set generator based on self-learning algorithms, and a reference rule set memory. The reference rule set memory is trained on the basis of a multiplicity of historical and/or current observation data about situations and processes of or around the objects 110, 116 to be monitored. This observation data may serve as a basis for the detection of patterns and regularities regarding possible situations and processes by means of the rule set generator. The rule set generator can comprise for example a support vector classifier, a neural network, a random forest classifier, a decision tree classifier, a Monte Carlo network or a Bayesian classifier.

The surveillance camera controller 5 may be used to check data patterns in the captured video data for deviations from data patterns that are to be expected and are classified as non-critical. To do so, the surveillance camera controller 5 has recourse, as reference, to the reference rule set stored in the reference rule set memory. In relation to this reference, the surveillance camera controller 5 checks whether deviations from situations or processes that are expected or should be regarded as normal have occurred at or around the object(s) 110, 116 to be monitored.

The results of this deviation analysis may then be used by the surveillance camera controller 5 to annotate the analysed image stream and to store the annotated image stream V2 in the permanent data storage 7. Such AI supported analysis may aid in identifying unusual activity at or around the object(s) 110, 116 to be monitored and may support a user reviewing the stored annotated image stream V2 when trying to find out whether any theft or unauthorized access may have occurred to the object under surveillance. The automated AI analysis, the annotation and the storage of the annotated video data may be performed by the surveillance camera controller 5 only and/or specifically when external triggers to do so are received.

The system 100 includes a surveillance controller 6 which is coupled to the surveillance camera controller 5. Moreover, the surveillance controller 6 receives object state signals S from one or more sensing devices 3 that are coupled to the surveillance controller 6 and are used to sense changes in the state of the object 110, 116 to be monitored. The surveillance controller 6, the surveillance camera modules 2 and (optionally) the permanent data storage 7 may be part of an already existing cabin video monitoring system 10 that may be implemented in an aircraft, such as the aircraft A. The cabin video monitoring system 10 may—apart from the surveillance functionality described herein—also be used to generate video data for other purposes such as for example for monitoring a passenger cabin, a cockpit door or other areas within an aircraft.

The sensing devices 3 may include various types of sensors capable of sensing conditions and changes in the conditions of their surroundings. For example, the sensing devices 3 may in some forms of implementation include a latch sensor which is coupled to a latch of a mobile transport container 110, 116. Such latch sensors may in particular be configured to sense a locking/unlocking state of one or more latches of the mobile transport container 110, 116.

The sensing devices 3 output an object state signal S to the surveillance controller 6 indicating a sensed state or a change of the sensed state of the object 110; 116 to be monitored. The surveillance controller 6, in turn, outputs a control signal C to the surveillance camera controller 5. This control signal C is used to instruct the surveillance camera controller 5 to change one or more of the operation parameters of the corresponding surveillance camera 4 if the object state signal S received from one or more sensing devices 3 indicates a sensed state of the object 110, 116 to have changed.

The surveillance camera controller 5 then controls the operation parameters of the corresponding surveillance camera 4 on the basis of the control signal C received from the surveillance controller 6. For example, the surveillance camera controller 5 may be configured to change one or more of the operation parameters of the corresponding surveillance camera 4 for a predetermined period of time after having received a control signal C from the surveillance controller 6. It may also be possible for the surveillance camera controller 5 to follow a hierarchical policy of changes to the operation parameters if multiple control signals C are received from the surveillance controller 6 within a predetermined period of time.

In particular, the surveillance camera 4 is already active, i.e. producing an image stream of captured video data within its field of vision, but under a first set of operation parameters, such as for example producing the image stream with a lower resolution, with a relatively low frame rate, with a reduced colour scheme or similar. Moreover, the surveillance camera 4 may store the captured video data only temporarily in a data storage internal to the surveillance camera 4 under this first set of operation parameters.

Once the surveillance camera controller 5 is instructed by means of the control signal C received from the surveillance controller 6 to change the operation parameters, the surveillance camera controller 5 may control the surveillance camera 4 to still be active, but under a second set of operation parameters different from the first set of operation parameters. For example, under the second set of operation parameters the surveillance camera 4 may produce the image stream with a higher resolution, with a relatively high frame rate, with a full colour scheme or similar. Furthermore, the surveillance camera 4 may not only store the captured video data only temporarily in a data storage internal to the surveillance camera 4, but also in the permanent data storage 7 external to the surveillance camera 4 under this second set of operation parameters.

The surveillance controller 6 may further be configured to send timestamp signals T to the permanent data storage 7 for timestamping the stored image stream(s) V1, V2 in order to identify the timing of the external triggers as indicated by the object state signals S from the sensing device(s) 3.

Figure 4:
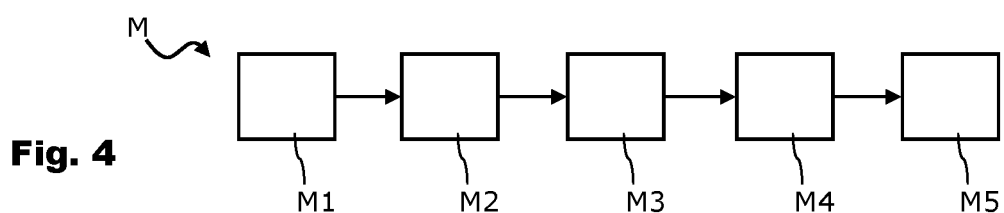
FIG. 4 shows a flowchart of a method of dynamically adjusting operation modes of a surveillance system on board of an aircraft, for example the aircraft as shown in FIG. 3, according to a further embodiment of the invention.

FIG. 4 shows a flowchart of a method M of dynamically adjusting operation modes of a surveillance system on board of an aircraft, for example surveillance system 100 of FIG. 2 on board of the aircraft A as shown in FIG. 3. The method M may comprise a first stage M1 in which an image stream in the field of vision D of at least one surveillance camera 4 monitoring an object 110, 116, such as a mobile transport container 110, 116 stowed away in a galley area 160 of an aircraft A is generated. At least one sensing device 3 senses in a second stage M2 a state of the object 110, 116 to be monitored. The sensing device(s) 3 may for example include a latch sensor coupled to a latch of a mobile transport container 110, 116. Such a latch sensor may be configured to sense a locking state of the latch of the mobile transport container 110, 116.

In a third stage M3, an object state signal S is output by at least one sensing device 3 to a surveillance controller 6 of the surveillance system 100 indicating a sensed state of the object 110, 116 to be monitored. Responsive to the object state signal S received from the at least one sensing device 3 indicating a sensed state of the object 110, 116 to have changed, a control signal C is sent from the surveillance controller 6 to a surveillance camera controller 5 in a fourth stage M4 of the method M. In response to the reception of the control signal C from the surveillance controller 6, the surveillance camera controller 5 changes operation parameters of the at least one surveillance camera 4 in a fifth stage M5 of the method M. These operation parameters indicate operation conditions of the at least one surveillance camera 4, such as for example image stream resolution, image stream frame rate, temporal storage length of the image stream and image stream permanent storage of the at least one surveillance camera 4.

For example, in some implementations, the surveillance camera controller 5 may control the at least one surveillance camera 4 to store the generated image stream V1 in a permanent data storage 7 on the basis of the control signal C received from the surveillance controller 6.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and exemplary embodiments. Many other examples will be immediately and directly clear to a person skilled in the art on the basis of his technical knowledge in view of the description above.

The exemplary embodiments were chosen and described in order to be able to represent the principles on which the invention is based and their possible uses in practice in the best possible manner. As a result, experts can optimally modify and use the invention and its various exemplary embodiments for the intended purpose. In the claims and the description, the terms "containing" and "having" are used as neutral concepts for the corresponding term "comprising". Furthermore, a use of the terms "a", "an" and "one" is not intended to fundamentally exclude a plurality of features and components described in such a way.

The invention claimed is:

1. A surveillance system on board of an aircraft, the surveillance system comprising:
   at least one surveillance camera having a field of vision within the aircraft encompassing an object to be monitored in the aircraft and generating an image stream of the field of vision which includes the object at a predetermined location in the aircraft when the object is in a locked mode and the field of vision includes the object as the object moves about the aircraft when the object is in an unlocked mode;
   a surveillance camera controller configured to control operation parameters of the at least one surveillance camera, the operation parameters indicating operation conditions of the at least one surveillance camera;
   a surveillance controller coupled to the surveillance camera controller; and
   at least one sensing device coupled to the surveillance controller and configured to sense whether the object is in the locked mode or the unlocked mode, and the at least one sensing device is configured to output an object state signal to the surveillance controller indicating whether the object is in the locked mode or the unlocked mode or a change occurred between the locked mode and the unlocked mode,
   wherein the surveillance controller is configured to output a control signal to the surveillance camera controller to change at least one of the operation parameters of the at least one surveillance camera if the object state signal received from the at least one sensing device indicates a change between the unlocked mode and the locked mode of the object.

2. The surveillance system according to claim 1, wherein the operation parameters include one or more of image stream resolution, image stream frame rate, temporal storage length of the image stream and image stream permanent storage of the at least one surveillance camera.

3. The surveillance system according to claim 2, further comprising a permanent data storage, the surveillance camera controller being configured to control the at least one surveillance camera to store the generated image stream in the permanent data storage based on the control signal received from the surveillance controller.

4. The surveillance system according claim 2, wherein the surveillance camera controller is configured to change the at least one of the operation parameters of the at least one surveillance camera for a predetermined period of time after having received a control signal from the surveillance controller.

5. The surveillance system according to claim 3, wherein the surveillance camera controller is configured to analyze the image stream generated by the at least one surveillance camera for deviations from a reference rule set based on self-learning algorithms, to annotate the analyzed image stream and to store the annotated image stream in the permanent data storage.

6. The surveillance system according to claim 1, wherein the object to be monitored is a mobile transport container configured to transport food, beverages and other merchandise in a passenger cabin of the aircraft, and
wherein the predetermined location is a storage position for the mobile transport container in a galley area of the passenger cabin.

7. The surveillance system according to claim 6, wherein the at least one sensing device includes a latch sensor coupled to a latch of the mobile transport container, the latch sensor being configured to sense whether the latch is in the unlocked mode or the locked mode.

8. An aircraft comprising the surveillance system according to claim 1.

9. The aircraft according to claim 8, further comprising a galley with one or more mobile transport containers which are the objects to be monitored by the surveillance system.

10. A method of dynamically adjusting operation modes of a surveillance system on board of an aircraft, the method comprising:
generating an image stream in a field of vision of at least one surveillance camera monitoring an object while the object is at a predetermined location within the aircraft while the object is in a locked mode and while the object moves about the aircraft while the object is in an unlocked mode;
sensing, by at least one sensing device, a state of the object to be monitored;
outputting, by the at least one sensing device configured to sense whether the object is in the locked mode or the unlocked mode or a change between the locked mode and the unlocked mode, an object state signal to a surveillance controller of the surveillance system indicating whether the object is in the locked mode or the unlocked mode;
outputting, responsive to the object state signal received from the at least one sensing device indicating whether the object has changed between the locked state and the unlocked, a control signal from the surveillance controller to a surveillance camera controller; and
changing, by the surveillance camera controller in response to the reception of the control signal from the surveillance controller, operation parameters of the at least one surveillance camera, the operation parameters indicating operation conditions of the at least one surveillance camera.

11. The method according to claim 10, wherein the operation parameters include one or more of image stream resolution, image stream frame rate, temporal storage length of the image stream and image stream permanent storage of the at least one surveillance camera.

12. The method according to claim 11, wherein the changing the operation parameters of the at least one surveillance camera includes controlling the at least one surveillance camera to store the generated image stream in a permanent data storage based on the control signal received from the surveillance controller.

13. The method according to claim 10, wherein the object to be monitored includes a mobile transport container configured to transport food, beverages and other merchandise in a passenger cabin of the aircraft, and
wherein the predetermined location is a storage position for the mobile transport container in a galley area of the passenger cabin.

14. The method according to claim 10, wherein the at least one sensing device includes a latch sensor coupled to a latch of the mobile transport container, the latch sensor being configured to sense whether the latch is in the unlocked mode or the latched mode.

15. The method according to claim 10, wherein the at least one surveillance camera is monitoring an object in a galley of an aircraft.

* * * * *